US012669470B2

(12) United States Patent
Pannetier-Lecoeur et al.

(10) Patent No.: US 12,669,470 B2
(45) Date of Patent: Jun. 30, 2026

(54) METHOD AND SYSTEM FOR MEASURING RELATIVE CONCENTRATIONS OF MATERIALS IN A MIXTURE BY MEASURING (AC) DYNAMIC MAGNETIC SUSCEPTIBILITY

(71) Applicant: COMMISSARIAT A L'ENERGIE ATOMIQUE ET AUX ENERGIES ALTERNATIVES, Paris (FR)

(72) Inventors: Myriam Pannetier-Lecoeur, Gif sur Yvette Cedex (FR); Claude Fermon, Gif sur Yvette Cedex (FR); Aurélie Solignac, Gif sur Yvette Cedex (FR); Julien Martinez, Bagnols sur Ceze Cedex (FR); Vincent Royet, Bagnols sur Ceze Cedez (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 98 days.

(21) Appl. No.: 18/721,952

(22) PCT Filed: Dec. 22, 2022

(86) PCT No.: PCT/EP2022/087436
§ 371 (c)(1),
(2) Date: Jun. 20, 2024

(87) PCT Pub. No.: WO2023/118413
PCT Pub. Date: Jun. 29, 2023

(65) Prior Publication Data
US 2025/0060336 A1      Feb. 20, 2025

(30) Foreign Application Priority Data
Dec. 22, 2021    (FR) ........................................ 2114295

(51) Int. Cl.
*G01N 27/72* (2006.01)

(52) U.S. Cl.
CPC ..................................... *G01N 27/72* (2013.01)

(58) Field of Classification Search
USPC ........................................... 324/201
See application file for complete search history.

(56) References Cited

U.S. PATENT DOCUMENTS 11,668,774 B2 * 6/2023 Schmidig ............... G01R 33/31
324/307

OTHER PUBLICATIONS

"Magnetic Susceptibility of the Elements and Inorganic Compounds", Edited by William M. Haynes, CRC Handbook of Chemistry and Physics, 93$^{rd}$ Edition, 2012, pp. 130-135.

(Continued)

*Primary Examiner* — Farhana A Hoque
(74) *Attorney, Agent, or Firm* — Oblon, McClelland, Maier & Neustadt, L.L.P.

(57) ABSTRACT

A method for measuring relative concentrations of materials in a mixture includes providing an emission coil and at least one reception coil, providing a mixture with n materials having different magnetic susceptibilities, and introducing the mixture into the reception coil. Using a voltage generator the emission coil is supplied with at least one nonzero excitation frequency so as to generate an excitation magnetic field and the signal of the voltage induced in the reception coil is measured. Relative concentrations of the n materials are determined based on comparison between the overall susceptibility of the mixture as obtained through the voltage measurement and that of a reference mixture for which the relative concentrations of the n materials are known.

24 Claims, 6 Drawing Sheets

(56)     References Cited

OTHER PUBLICATIONS

Deutz et al., "Automatic Mutual inductance Bridge for accurate ac susceptibility measurement from 1.2 to 300K", Review of Scientific Instruments, vol. 60, No. 1, Jan. 1989, pp. 113-120 (Total 9 pages).
Alderighi et al., "A room-temperature alternating current susceptometer-Data analysis, calibration, and test", Review of Scientific Instruments, vol. 84, Dec. 16, 2013, 9 pages.

* cited by examiner

Measurement as a function of the concentration (%)

METHOD AND SYSTEM FOR MEASURING RELATIVE CONCENTRATIONS OF MATERIALS IN A MIXTURE BY MEASURING (AC) DYNAMIC MAGNETIC SUSCEPTIBILITY

TECHNICAL FIELD

The present invention relates to the field of measuring concentrations of materials within a mixture, notably a binary mixture.

The invention mainly aims to optimize this type of measurement, by proposing a compact, reliable, rapid, non-destructive solution that allows integration in a restrictive environment, notably in terms of available space, and/or in a continuous production line.

Even though it is described with reference to measuring the relative content of plutonium (Pu) and uranium (U), and associated oxides in the form of MOX fuel powders or pellets, the invention applies to measuring relative mass percentages of solid materials each having a given magnetic susceptibility of a binary mixture, or, more generally, to any measurement of any mixture of materials, even of non-binary materials, each having a given magnetic susceptibility.

By way of another example, the invention applies to the case of a solid material and/or a mixture containing impurities (of the ferromagnetic or metallic type), the susceptibility of which, even as a low concentration in the mixture, has a much higher susceptibility signature (at least one order of magnitude) than the susceptibility of the other constituent elements.

PRIOR ART

The manufacture of new MOX ("Mixed OXide Fuel") type nuclear fuel pellets involves a method successively comprising the steps of mixing a dioxide powder of $UO_2$ and of $PuO_2$, of pressing and of sintering. The mixture optionally can be supplemented by chamotte (pellet manufacturing scrap).

The MOX fuel pellets that are obtained can be, for example, irradiated in light water reactors (or LWR) or fast neutron reactors (or FNR).

The reproducibility of the plutonium or uranium composition of the pellets is one of the major manufacturing limitations. Thus, it is considered to be important that the composition for each production batch is systematically known.

More specifically, the relative mass concentrations, or, in other words, the relative mass percentages of oxides of Pu and of U and of the associated oxides notably need to be known in MOX pellets originating from a production line. This knowledge must be able to be provided either from an analysis laboratory or from a compact device to be installed in a nuclear glove box or on a continuous production line.

The solutions that are currently implemented for measuring relative concentrations are methods requiring in-depth chemical analyses of the pellets.

Even though they are precise and selective, chemical analyses are destructive, lengthy, typically lasting for several hours/days before the results are obtained, are not really systematically applicable, and require sampling from a production line, which limits the statistics with respect to a production batch.

Solutions using spectroscopy have also been proposed. They have the same disadvantages as chemical analyses.

Another solution involving magnetometry measurement (VSM (Vibrating Sample Magnetometry) has also been proposed. It involves measuring, under a static, variable and high value magnetic field, typically of more than 1 tesla, the magnetic moment of the pellet sample. This standard laboratory technique requires the implementation of a large electromagnet or superconductive magnet. As a result, since it is practically impossible to introduce the latter into a glove box or onto a nuclear production line, it makes such a VSM measurement solution prohibitive.

Consequently, a requirement exists for improving the solutions for measuring mass concentrations of materials within a mixture, notably a binary mixture, notably in terms of the spatial requirement, in order to be able to install objects, such as MOX fuel pellets, in a restrictive environment, such as a nuclear environment, and/or on a continuous production line.

The aim of the invention is to at least partly respond to this requirement.

DISCLOSURE OF THE INVENTION

To this end, the invention relates, according to one of the aspects thereof, to a method for measuring relative concentrations of materials of a mixture, comprising the following steps:

a/ providing an emission coil and at least one reception coil;

b/ providing a mixture comprising n materials with different magnetic susceptibilities ($\chi^1$, $\chi^2$, ... $\chi^n$);

c/ introducing the mixture into the reception coil;

d/ using an electric voltage generator to supply the emission coil with at least one non-zero excitation frequency so as to generate an excitation magnetic field;

e/ measuring the signal of the electric voltage induced in at least one reception coil;

f/ determining the relative concentrations of the n materials based on a comparison between the overall susceptibility of the mixture obtained by the voltage measurement according to step e/ and that of a reference mixture for which the relative concentrations of said n materials are known.

According to an advantageous embodiment, in the case where n=2, the method comprises, in step f), based on the mass of the mixture m(mix)=m1+m2, determining the susceptibility of the mixture provided using the relationship:

$$\chi mix = \frac{m1\chi 1}{m1 + m2} + \frac{m2\chi 2}{m1 + m2}$$

and, knowing the various magnetic susceptibilities ($\chi 1$, $\chi 2$), determining the respective mass concentrations of the materials using the following relationships:

$$m1 = m(mix)\left(\frac{\chi mix - \chi 2}{\chi 1 - \chi 2}\right)$$

and $$m2 = m(mix)\left(\frac{\chi mix - \chi 1}{\chi 2 - \chi 1}\right).$$

According to an advantageous alternative embodiment, the method further comprises, in step e/, either an in-phase measurement of the signal of the electric voltage induced in the at least one reception coil and/or a phase quadrature measurement so as to obtain the modulus of the signal.

Advantageously, the reception coil is tuned so that its resonant frequency is substantially equal to at least one excitation frequency.

The mixture provided according to step b/ can be a binary mixture of materials with two different magnetic susceptibilities ($\chi 1$, $\chi 2$).

According to an advantageous embodiment, the method comprises, after step b), a step b1/ comprising weighing the mixture so as to obtain, in step f), a relative mass concentration of said mixture.

The mixture provided according to step b/ can be a mixture comprising more than two materials, with one of the materials having a much higher susceptibility than that of the other materials. The other materials can be ferromagnetic or metallic impurities, etc. Thus, the invention allows the susceptibility of a constituent element to be measured even with a low concentration relative to the other constituent elements of the mixture provided that this constituent element has a much higher susceptibility than those of the other materials, for example, by a factor of 100.

Indeed, in this case, the susceptibility of the mixture, which is provided by:

$$\chi\text{mix} = \frac{m1\chi 1}{\sum (m1 + m2 + \dots \ mn)} +$$
$$\frac{m2\chi 2}{\sum (m1 + m2 + \dots \ mn)} + \dots + \frac{mn\chi n}{\sum (m1 + m2 + \dots \ mn)}$$

with the respective masses and susceptibilities of n materials of the mixture, is simplified if one of the materials (in this case of mass m1 and susceptibility $\chi 1$) has a susceptibility that is much higher than that of the others at:

$$\chi\text{mix} = \frac{m1\chi 1}{\sum (m1 + m2 + \dots \ mn)}$$

According to a preferred application, the mixture provided according to step b/ can be in the form of a solid compound. The term "solid compound" is understood herein, and within the scope of the invention, to equally mean a compact pellet and a powder or any other solid structure.

According to an advantageous alternative embodiment, step d/ comprises applying a given voltage by varying the excitation frequency.

Preferably, the excitation frequency is greater than 10 kHz, preferably greater than 100 kHz, preferably ranging between 100 and 250 kHz.

According to a first configuration, step a/ comprises providing a single reception coil, the method further comprising, before step c/, carrying out steps e/ and f/ so as to obtain the basic signal representing the empty single reception coil.

Alternatively, step a/ comprises providing two, preferably identical, reception coils, the method comprising, before step f/, repeating steps c/ to e/ with each of the two reception coils, and an additional step e1/ of subtracting, between the two measurements, the signals induced by the two coils.

According to this alternative, the method advantageously comprises electrically connecting the two reception coils in series, preferably assembled with inverted windings, and tuning their respective reception frequencies. This allows the output signal-to-noise ratio to be improved and the output signal to be increased, with the measurement taking place around the resonant frequency of the reception coils.

Preferably, step e/ is carried out for each excitation frequency, with synchronous detection.

More preferably, step e/ can be made up of several measurements, each at a reception frequency around the resonant frequency of the one or more detection coils. Advantageously, step d/ is carried out so as to generate an excitation magnetic field with a value of less than 50 mT, preferably ranging between 1 and 20 mT. This low magnetic field offers the advantage of not requiring a large coil in order to be generated, which makes the acquisition portion of the system compact and therefore compatible with a limited spatial requirement.

According to an advantageous embodiment, when the mixture comprises a ferromagnetic material, the method comprises, before step c/, an additional step b2/ involving exposing the mixture to a constant magnetic field.

A further aim of the invention is a system for measuring relative concentrations of materials of a mixture, intended to implement the method described above, comprising:

an electric voltage generator for providing at least one frequency, called excitation frequency;

an emission coil connected to the generator;

at least one reception coil, the shape of which is adapted to receive a mixture comprising at least two materials with different magnetic susceptibilities and the reception frequency of which is tuned to the at least one excitation frequency;

voltage measurement means connected to the one or more reception coils.

Preferably, the generator is a variable-frequency low-frequency generator (LFG). Preferably, the generator is configured so that the excitation frequency is greater than 10 kHz, preferably than 100 kHz, preferably ranging between 100 and 250 kHz.

Typically, for a mixture of oxides with magnetic susceptibility of the order of a tenth to ten millimu·mol$^{-1}$, the frequency range can range between 100 and 250 kHz.

It should be noted that the frequency is selected independently of the value of the susceptibilities, but according to the design of the coils. Consequently, the system according to the invention does not need to be adjusted to the type of material, but rather to the dimensions of the sample to be analyzed.

According to an alternative configuration, the system comprises two reception coils electrically connected in series, the respective reception frequencies of which are tuned.

According to an alternative arrangement, the one or more reception coils is/are arranged inside the excitation coil. The acquisition portion of the system (relevant emission and reception coils of the electrical connections) is thus compact.

According to an advantageous embodiment, the system further comprises:

a housing for electromagnetic protection;

a first connector mounted in the housing, connected to the emission coil by a first power supply wire inside the housing, with the first connector being intended to be remotely connected to the generator by a first power supply cable;

a second connector mounted in the housing, connected to at least one reception coil by a second power supply wire inside the housing, with the second connector being intended to be remotely connected to the measurement means by a second power supply cable. Such an arrangement facilitates the integration of the system in a restrictive environment, notably a nuclear environment, such as a glove box, in particular by virtue of the limitation of the interface cables between the housing that houses the measurement acquisition (coils) and the measurement electronics portion, with the latter and the power supply generator not having to be arranged in the nuclear environment.

Furthermore, this makes the measurement acquisition portion (coils) immune to radiation since, by virtue of the interface cables with the housing, the measurement electronics and the power supply generator can be remotely positioned outside the environment in which radiation is emitted.

According to an advantageous alternative embodiment, the measurement means comprise a synchronous detection amplifier.

According to an advantageous configuration, the one or more reception coils is/are coaxially arranged inside the emission coil by defining a passage therein for a portion of a conveyor adapted to move the mixture in the form of a solid product, such as a pellet. The conveyor can be manual or motorized.

Preferably, the system comprises two, preferably identical, reception coils remotely arranged one behind the other, and arranged relative to the emission coil so as to carry out three successive measurements when the solid product moved by the conveyor is respectively outside the reception coils, in one of the reception coils and then in the other one of the reception coils.

Advantageously, the portion of the conveyor passing through the reception coils is a band or belt of a motorized conveyor. Thus, easy integration within a production line is possible, notably within a production line for solid objects with a binary mixture of materials with a different magnetic susceptibility. This can involve lines for producing MOX nuclear fuel pellets.

Finally, the aim of the invention is the application of the method or the system described above for measuring relative mass concentrations of plutonium (Pu) and uranium (U), and associated oxides in MOX-type nuclear fuel pellets. The invention also applies in the field of the nuclear fuel cycle of UOX pellets (for impurities). It is also applicable to the detection of metal-type impurities in the MOX.

Thus, the invention basically involves measuring relative concentrations, either by %, or by mass, of any composite mixture of two or more paramagnetic materials, by weighing and measuring the overall magnetic susceptibility ($\chi$mix) of the mixture by means of a system with emission (magnetic excitation) and reception coils and by means of a comparison with a calibrated mixture of the same materials of known weight and mass concentrations.

According to the invention, the measured quantity is therefore the magnetic susceptibility of the mixture, with a fixed or variable frequency measurement and with a generally fixed amplitude magnetic field, with a low amplitude, typically a few mT. This weak field is generated by a coil system that is simple to implement and is compact.

An additional measurement of the weight of the mixture can be carried out.

Thus, if the susceptibilities of the two materials of a binary mixture are respectively $\chi$1 and $\chi$2, and the mass of the mixture m(mix)=m1+m2, then the susceptibility of the mixture is provided by the relationship:

$$\chi\mathrm{mix} = \frac{m1\chi1}{m1 + m2} + \frac{m2\chi2}{m1 + m2}$$

This mean that it is possible, knowing $\chi$1 and $\chi$2, based on a table or measurements of the pure compounds, to deduce:

$$m1 = m(\mathrm{mix})\left(\frac{\chi\mathrm{mix} - \chi2}{\chi1 - \chi2}\right)$$

and $$m2 = m(\mathrm{mix})\left(\frac{\chi\mathrm{mix} - \chi1}{\chi2 - \chi1}\right)$$

Thus, based on these non-invasive measurements, and on the comparison with a known reference, the composition of the mixture can be known.

For the known reference, the weight and a reference signal are established beforehand.

The reference signal is either known from tables, from literature, etc., or from a prior calibration measurement by means of a measurement system according to the invention.

Thus, typically, for MOX pellets, calibration with pure $PuO_2$ and $UO_2$ pellets can be carried out beforehand in order to obtain the reference signal.

The inventors have carefully considered using the difference in the magnetic susceptibility value of paramagnetic materials in a mixture in order to evaluate their relative mass percentages using a dynamic susceptibility measurement.

The dynamic susceptibility measurement, often called AC susceptibility, is not highly developed but has already been described in some articles.

Thus, the publication [1]proposes a system for measuring AC susceptibility covering a wide temperature range. For its part, the article [2] proposes a two-coil susceptometer operating between 100 Hz and 100 kHz.

A dynamic (AC) susceptibility measurement system is marketed by Quantum Design.

These various systems operate over a wide frequency band and allow a susceptibility value to be obtained in a typical time of one minute for a given frequency.

In general, the measurement targeted by the known systems relates to an evolution of the susceptibility as a function of an external parameter such as the temperature or the pressure, in order to feedback information such as the phase transitions of a given material.

However, surprisingly, no one has considered using the dynamic (AC) susceptibility measurement to measure a ratio of mass concentration of a mixture with two or more materials with different magnetic susceptibilities.

According to a preferred application, the measurement is implemented in order to know relative mass concentrations in MOX fuel pellets, in which the two oxides of interest have different magnetic susceptibility values, with the value $\chi$ of $UO_2$ being equal to $3.0.10^{-3}$ emu·mol$^{-1}$, while that of $PuO_2$ is equal to $0.4.10^{-3}$ emu·mol$^{-1}$, according to article [3].

Finally, the invention provides numerous advantages, including:

much faster measurement than the measurement, chemical or spectroscopy solutions of the prior art. Typically, with an AC susceptibility measurement according to the invention, the measurement time per MOX fuel pellet can be of the order of a few seconds;

the possibility of no longer measuring by taking a few samples from a production batch, as in the prior art, but by measuring systematically for each produced mixture, notably for each nuclear fuel pellet in production;

the dimensions of the equipment and the compactness of its measurement acquisition portion (housing and coils housed inside) make a measurement system according to the invention more easily compatible with a nuclear environment compared to the solutions of the prior art, notably to the magnetometry measurement system (VSM);

a measurement system that can be easily integrated into a continuous production line for products with a mixture of materials, for example, in a pellet manufacturing/conveyance line;

the possibility of using the measurement method and system for any composite mixture of at least two distinct paramagnetic or ferromagnetic materials;

the possibility of knowing the homogeneity of a mixture, based on the analysis of the shape of the measurement signal, unlike the solutions of the prior art.

Further advantages and features of the invention will become more clearly apparent upon reading the detailed description of embodiments of the invention, which are provided by way of a non-limiting illustration with reference to the following figures.

DETAILED DESCRIPTION

Throughout the present application, the terms "lower", "upper", "bottom", "top", "below" and "above" are to be understood with reference to housings.

Figure 1:
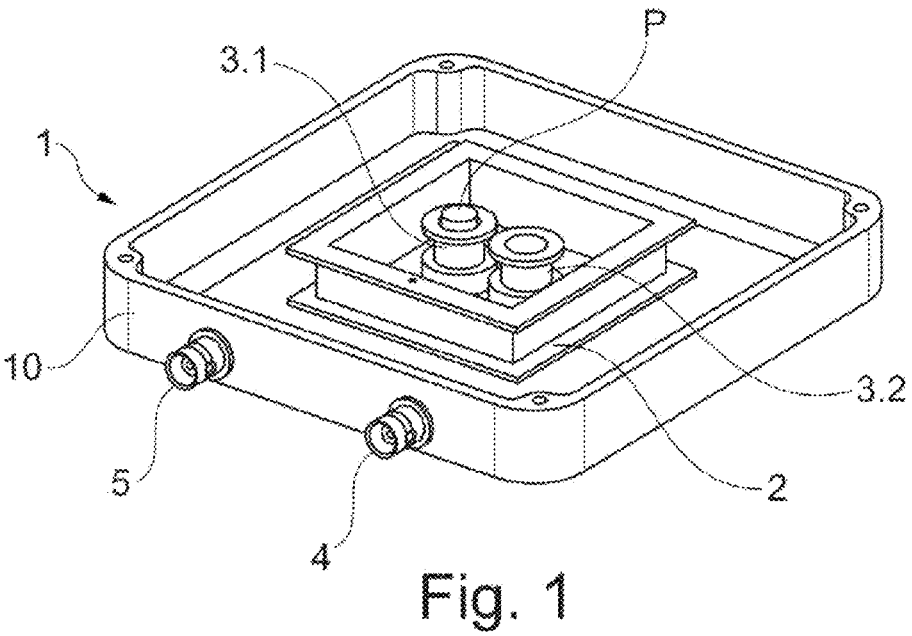
FIG. 1 is a schematic perspective view of a system for measuring relative mass concentrations of two materials of a binary mixture in the form of a solid pellet, according to the invention.
Figure 2:
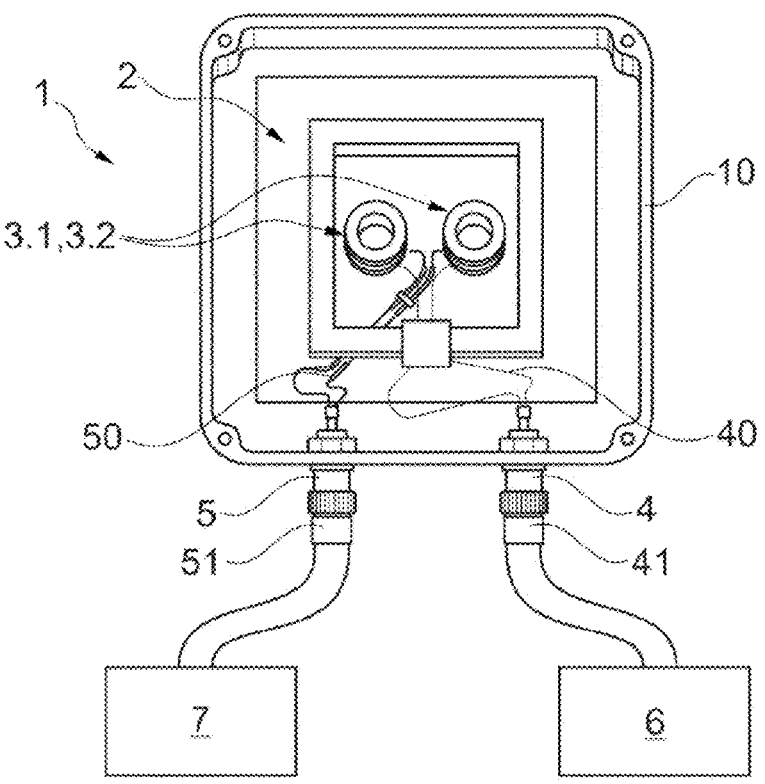
FIG. 2 is a photographic view of an example of the system according to the invention with a portion of the connector implemented according to the invention.

FIGS. 1 and 2 show an example of a device 1 forming the acquisition portion of a system for measuring, by magnetic susceptibility, mass concentrations of the Pu and U oxides in MOX fuel pellets.

This device 1 firstly comprises a housing 10, advantageously for electromagnetic protection, in which an emission coil (excitation) 2 and two reception coils 3.1, 3.2, are respectively housed, and are advantageously identical and mounted in electrical series. The excitation 2 and reception 3.1, 3.2 coils in this case are arranged in the same plane. They are advantageously mounted with an inverted winding so that the emission field provides the weakest possible signal in the reception coils.

In the illustrated example, the emission coil 2 is in the form of a frame that houses the reception coils 3.1, 3.2, which in turn are each in the form of a hollow cylinder. The diameter and the height of this cylinder are typically selected to house a pellet P of MOX fuel therein. In general, the lateral dimensions of a housing 10 typically can be of the order of 5 to 10 times the diameter of a pellet P. Thus, the housing 10 can be lightweight and highly compact, which allows it to be easily brought to and positioned in a highly restrictive environment, such as a glove box.

The dimensions of the excitation coil 2 can be reduced because the desired excitation magnetic field can be of the order of a few mT, typically between 1 and 20 mT.

A first connector 4 is mounted in the housing 10 and is connected to the emission coil 2 by a first power supply wire 40 inside the housing. This first connector 4 is remotely connected to a low-frequency generator 6 by a first power supply cable 41.

A second connector 5 is mounted in the housing 10 and is connected to the reception coils 3.1 and 3.2 by a second power supply wire 50 inside the housing. This second connector 5 is remotely connected to a synchronous detection amplifier 7 by a second power supply cable 51.

Thus, the housing 10 is compact and contains the entire measurement acquisition portion of the system (coils 2; 3.1, 3.2) and the relevant connector, with the low-frequency generator 6 and the amplifier 7 being remote from the environment in which the housing is installed.

Thus, if the environment is subjected to radiation, the signal generation portion and the signal processing portion are immune, i.e., protected, from radiation.

A description will now be provided of a method for measuring relative mass concentrations of materials of a binary mixture in the form of a solid pellet implemented according to the invention, notably by the system described above.

Step a/: a device 1 according to FIGS. 1 and 2 is installed by connecting the electrical connections to the low-frequency generator 6 and to a synchronous detection amplifier, respectively.

The two reception coils 3.1, 3.2 are installed parallel to a capacitor, the value of which is selected so as that of the resonance of this LC circuit is between 50 kHz and 200 kHz. For small pellets, a frequency up to a few MHz can be selected.

Step b/: a sample of a solid pellet P of MOX fuel is provided in order to evaluate the respective mass concentrations of PuOx and UOx.

Step b1/: the pellet P is weighed. This step usually can be carried out using conventional weighing scales.

Step c/: the pellet P is introduced into the first reception coil 3.1 and then into the second reception coil 3.2, as illustrated in FIG. 1.

Step d/: the emission coil 2 is powered by the low-frequency generator 6, at a variable, non-zero excitation frequency, so as to generate an excitation magnetic field in the coil 2. The power supply can be interrupted when the pellet P transitions from the first to the second reception coil.

Field excitation of the excitation coil 2 is therefore carried out by applying a given voltage, typically of a few volts, by varying the frequency, typically up to a few 100 Khz or a few MHz.

Step e/: the signal of the electric voltage induced in the reception coil 3.1, and then in that of the reception coil 3.2, is measured in phase and in quadrature for each excitation frequency.

The voltages measured at the terminals of these two coils 3.1, 3.2 are advantageously subtracted and then amplified by the synchronous detection amplifier 7.

In the absence of a pellet P, the signal obtained at the output of the two coils 3.1, 3.2 undergoing the application of the excitation field is zero or balanced in order to be close to zero. Its value can be noted as equal to V0.

Undertaking the measurement by the difference between the signals originating from the two reception coils means that it is possible to eliminate the shift to be added to the value V0. Thus, the need for a prior no-load measurement is eliminated.

When the pellet P is present in the first reception coil 3.1, the reception signal assumes a value V1=V0+dV, and when the pellet P is in the second coil 3.2, the value of the signal is V2=V0–dV.

Thus, the difference is V1–V2=2 dV, where dV is proportional to the complex magnetic susceptibility of the pellet P.

At each measured frequency point, the output signal measured by the amplifier 7 grants access to the in-phase and quadrature signal relative to the excitation signal, at the measured frequency.

Typically, measurements between 1 and 20 frequency points around the resonant frequency of the detection can be carried out.

The in-phase and quadrature signals provide information concerning the complex magnetic susceptibility of the pellet (real X and Y imaginary components; X=X+iY) at the measurement frequency. When the method of the invention only measures the in-phase signal, the measurement that is obtained is proportional to the real part of the magnetic susceptibility, and when the method of the invention measures the in-phase signal and the quadrature signal, the measurement that is obtained grants access to the real and imaginary components and therefore to the modulus.

Figure 3A:
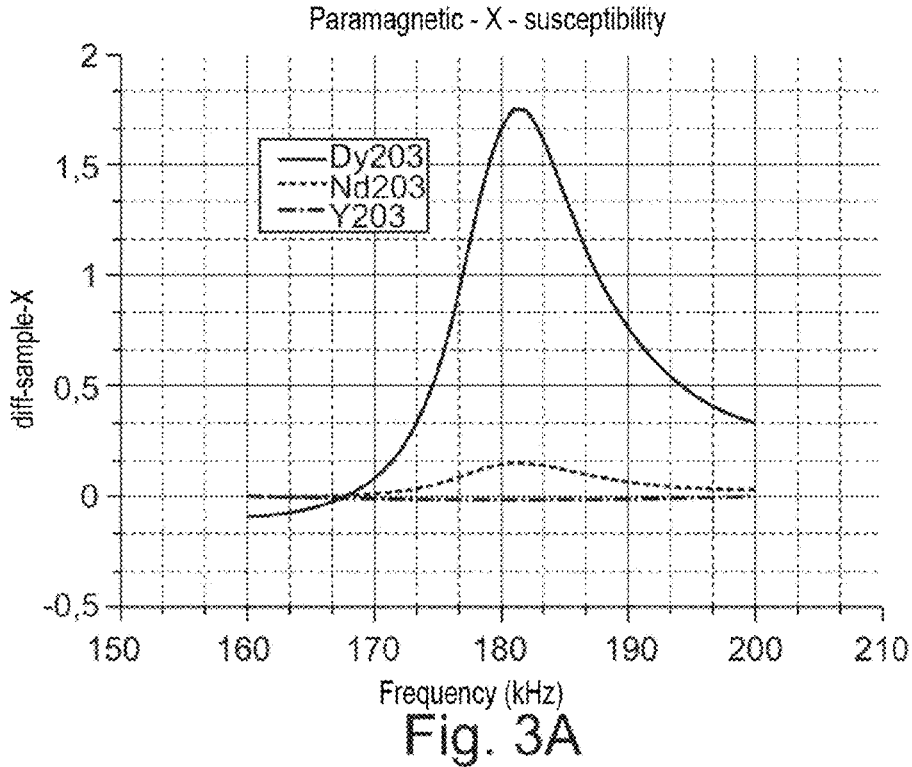
FIG. 3A uses a curve to illustrate the in-phase measurement for various paramagnetic components in a system according to the invention, the reception coil frequency of which is tuned to the excitation frequency.
Figure 3B:
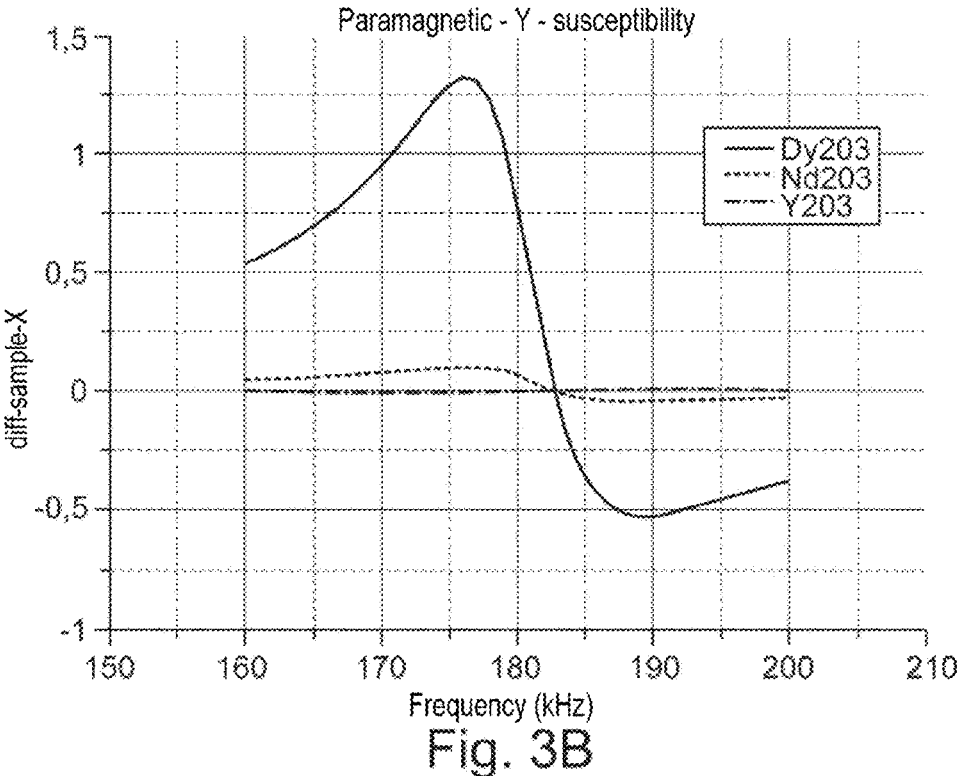
FIG. 3B uses a curve to illustrate the quadrature measurement for the various paramagnetic components, as in FIG. 3A.

An example of in-phase and quadrature measurements for various paramagnetic materials in a system 1 according to the invention, the reception frequency of which has been tuned around 180 kHz, is shown in FIGS. 3A and 3B.

The various materials that are tested are a dysprosium oxide, with the formula $Dy_2O_3$, a neodymium oxide, with the formula $Nd_2O_3$, and an yttrium oxide, with the formula $Y_2O_3$.

Step f/:

Based on a frequency scan over the contemplated range of excitation frequencies, it is possible to extract the modulus M and the integral I from these measurements on said frequency range according to the following equations.

$$M = \sqrt{X^2 + Y^2} \qquad \text{[Equation 1]}$$

$$I = \sum_{f_0}^{f_n} M_n \qquad \text{[Equation 2]}$$

These modulus and integral values then allow a quantitative comparison to be made of the considered sample (pellet) relative to a reference sample, for which the relative mass concentrations of the two materials are known.

With the comparison of the masses between the measured sample and the reference sample, the mass concentrations of the two materials in the sample are ultimately determined.

Typically, for a pellet P of MOX, the comparison is established relative to a pure pellet of $PuO_2$ and of $UO_2$ by mass.

Figures 4, 5:
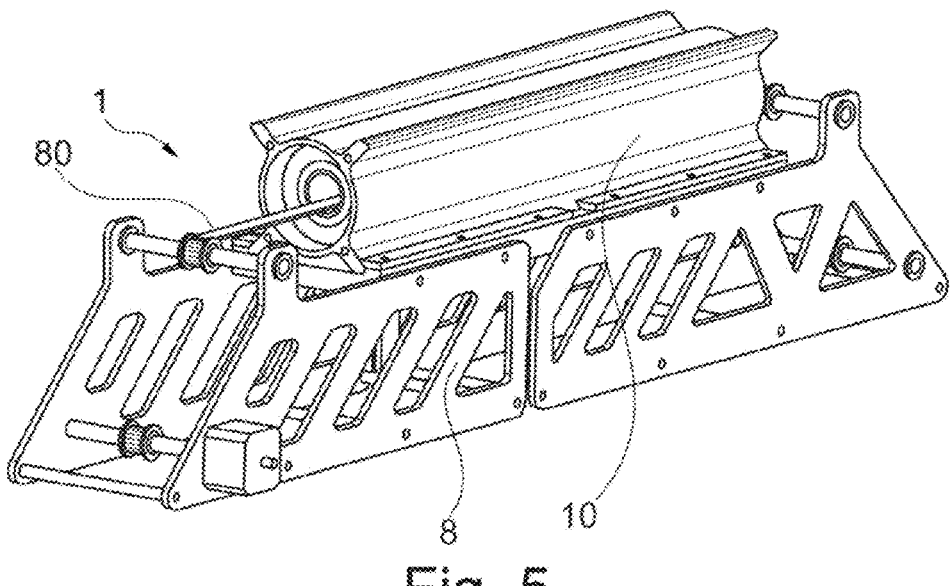
FIG. 4 uses a curve to illustrate an example of measurements of a sample with a variable concentration of a binary mixture in the form of a solid pellet, which measurements are obtained according to the invention.
FIG. 5 is a perspective view of a measurement system according to an embodiment of the invention integrating part of a motorized conveyor system.

FIG. 4 illustrates measurements of samples with a variable concentration of a mixture of two materials with different magnetic susceptibility, obtained in accordance with the method described above. It should be noted that, in FIG. 4, the abscissa represents the concentration by % and the ordinate represents the integral of the signal (arbitrary units), detected by the amplifier 7.

Figure 6:
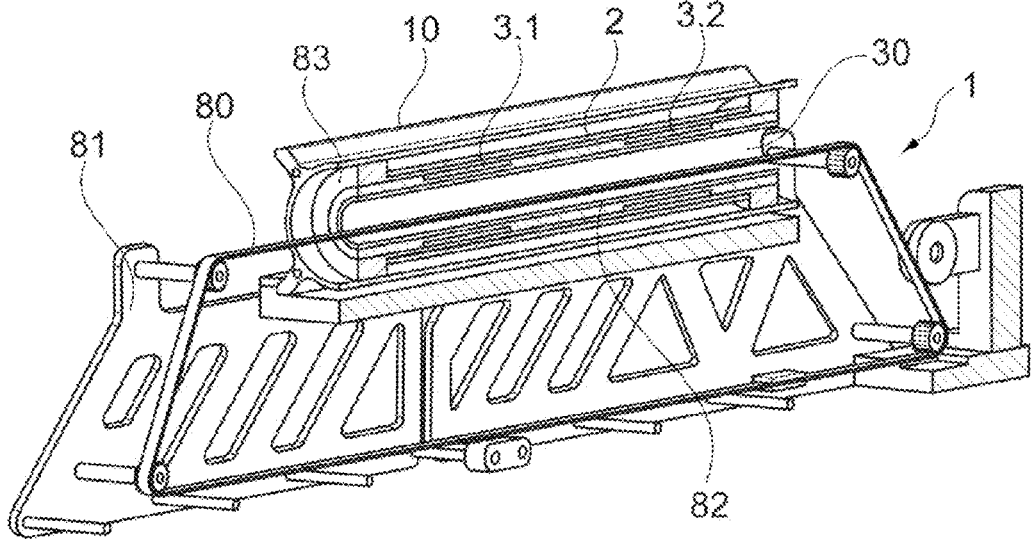
FIG. 6 is a section view of the system according to FIG. 5.

FIGS. 5 to 6 show an alternative device to that shown in FIGS. 1 and 2.

In this device, the reception coils 3.1, 3.2 are coaxially arranged inside the emission coil 2 by defining a passage 30 therein for a portion of a conveyor 8 with a band 80, adapted to move the mixture in the form of a solid product, such as a pellet.

More specifically, the conveyor 8 comprises a frame 81 supporting the electromagnetic shielding housing 10 formed by an outer cylinder and an inner cylinder 82 separated by spacers 83 and the interior of which defines the passage 30 for the pellets to be measured.

The excitation coil 2 is arranged between the spacers 83 and the outer cylinder 10 in the form of a coaxial cylinder.

The two reception coils 3.1, 3.2, each in the form of a coaxial cylinder, are arranged between the spacers 83 and the inner cylinder 82 at a distance from each other.

This device allows automated conveyance of the samples to be measured from the first reception coil 3.1 to the next 3.2.

The sample is conveyed by a manual or motorized system along the excitation cylinder 2, from the first to the second coil by moving the conveyor band or belt 80.

Conveying the sample allows three measurement positions to be reached, namely, respectively, an empty position when the sample is in none of the reception coils, when the sample is in the first reception coil 3.1, then when it is in the second reception coil 3.2.

For the measurement, the sample preferably moves at a constant speed within each of the two reception coils 3.1, 3.2. This offers the advantage of not notably reducing, if at all, the rate of a production line.

In order to increase the measurement speed, the measurement can be carried out on a discrete number of frequencies, typically three measurements carried out simultaneously. In the case of an even faster measurement, a single frequency is used and the signal is only measured in only one of the reception coils 3.1, 3.2.

Indeed, it is easy to send a single frequency and to measure, by synchronous detection, at this frequency, the response of the sample. It is also possible to send three frequencies simultaneously with, for example, a random frequency generator and to measure, by detection, with three synchronous modulators over these three frequencies. This allows, by adjustment, the frequency response of the system to be reconstructed into a single measurement instead of carrying out measurements at different frequencies one after the other.

Of course, it is possible to increase or decrease the number of frequencies simultaneously, for example, by 2 or 4 or more.

When the sample is centered on the cylinder of a reception coil, i.e., its median plane is substantially coincident with that of the coil, then the received signal is maximal and depends on the concentration ratio of the materials in the sample.

If the passage of the samples is continuous, a repetitive measurement can be carried out in order to determine the signal when the sample is at the center of the reception coil, which corresponds to the maximum of the received signal.

Based on an independent mass measurement carried out in addition to the measurement of the maximum obtained signal, the ratio of mass concentrations of the materials in the sample is determined as described above.

The method and system described above can be implemented for a ferromagnetic sample.

In this case, an additional step b2/ is carried out that involves exposing the sample to a constant magnetic field.

Figure 7A:
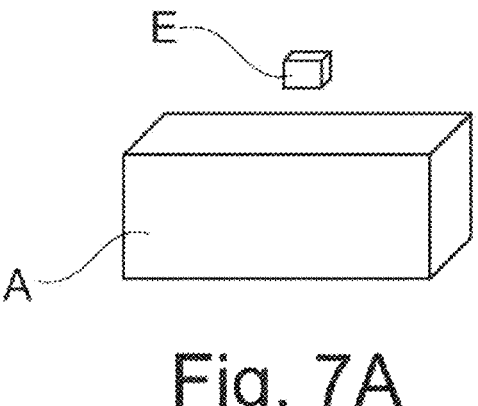
FIG. 7A is a schematic view illustrating a prior step of magnetizing a ferromagnetic product according to an alternative embodiment of the measurement method according to the invention.
Figure 7B:
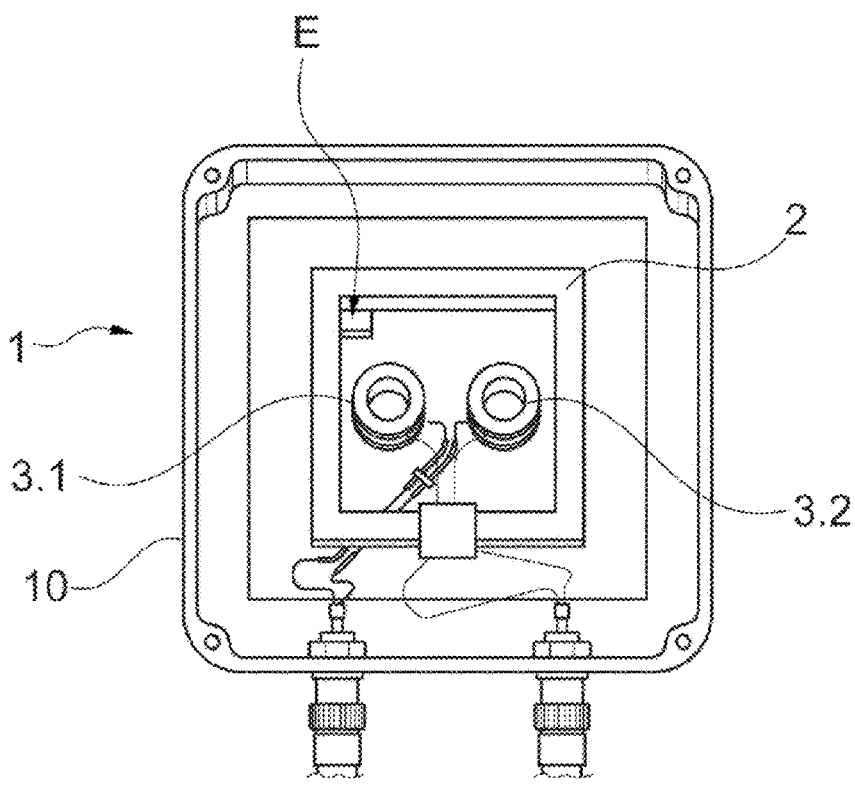
FIG. 7B is a schematic view illustrating the step of introducing the product magnetized according to FIG. 7A into a reception coil in order to implement the measurement method according to the invention.

This is shown in FIG. 7A, where the sample E is pre-magnetized by means of a permanent magnet and then introduced into the first reception coil 3.1, as in FIG. 1.

The aforementioned measurement steps d/ to e/ are then carried out.

The inventors carried out modulus measurements M of complex magnetic susceptibilities of various samples each containing variable quantities of carbon nanotubes, which are known for their ferromagnetic signature of the iron used for the synthesis, in a non-ferromagnetic matrix. They compared the obtained results with the magnetic moments measured using VSM.

Figure 8:
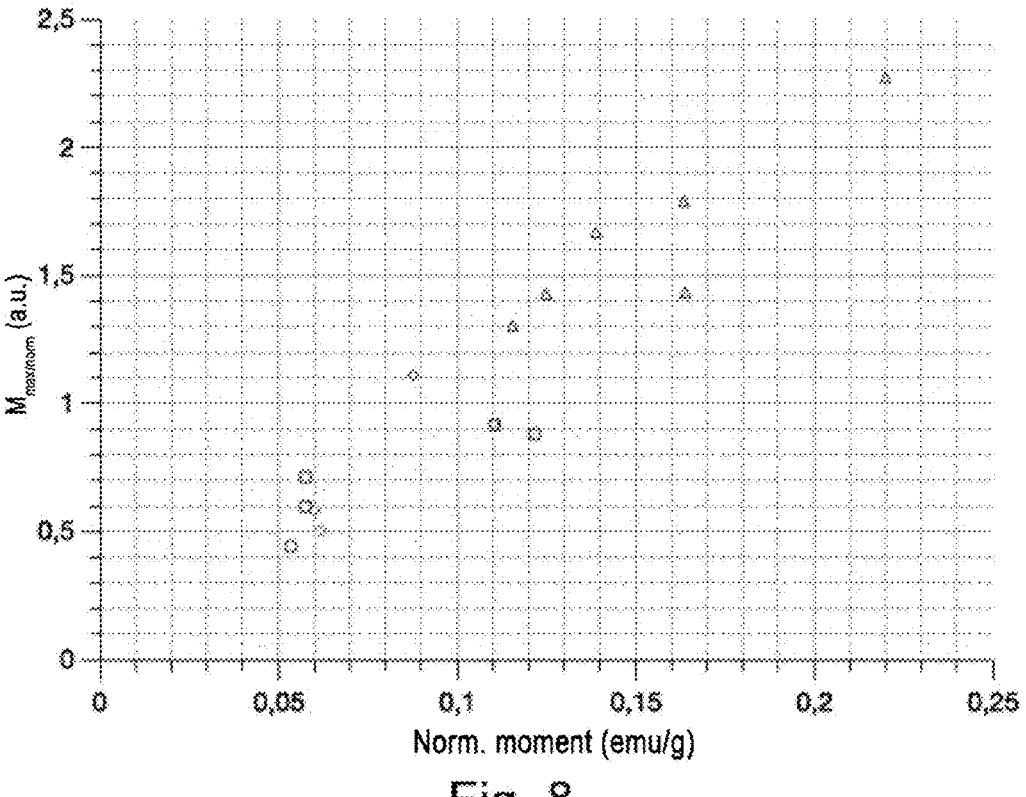
FIG. 8 uses a graph to illustrate measurements of maximum modulus values of the magnetic susceptibility, for samples containing carbon nanotubes in a non-ferromagnetic matrix, with the measurements being obtained by the method according to the present invention, as a function of the magnetic moments of said samples measured using VSM.

The comparative results are illustrated in FIG. 8, in which the maximum values of the moduli (on the ordinate) measured by the method according to the present invention are a function of the magnetic moments measured using VSM (on the abscissa), with the maximum values of the moduli ($M_{max/norm}$) and the magnetic moments (Moment norm.) being normalized by the respective masses of the samples. In this FIG. 8, the squares represent the samples with a carbon nanotube concentration that is close to 0.5% by mass, the diamonds represent the samples with a carbon nanotube concentration that is close to 1.0% by mass, the triangles represent the samples with a carbon nanotube concentration that is close to 2.0% by mass.

As can be seen in FIG. 8, a linear relationship does indeed exist between the maximum values of the moduli and the magnetic moments. Thus, measuring the modulus, or even the integral, of the magnetic susceptibility is indeed proportional to the quantity of ferromagnetic material.

The invention is not limited to the examples described above: it is notably possible to combine features of the illustrated examples in alternative embodiments that are not illustrated.

Other alternative embodiments and improvements can be contemplated without departing from the scope of the invention.

Several configurations and arrangements of coils other than those shown in the various figures, notably in the case of a less restrictive environment in terms of spatial requirement and/or non-nuclear power, can be contemplated.

The method according to the invention operates with a single reception coil. In this case, a prior no-load measurement can be carried out, in order to obtain the basic signal that corresponds to the shift less the value V0.

Instead of using a synchronous detection amplifier, it is possible to contemplate measuring the signal of each of the reception coils with sufficient accuracy and to differentiate between their signals in digital form only.

LIST OF CITED REFERENCES

[1]: Review of Scientific Instruments 60, 113 (1989); https://doi.org/10.1063/1.1140593.
[2]: Review of Scientific Instruments 84, 125105 (2013); https://doi.org/10.1063/1.4842255.
[3]: "MAGNETIC SUSCEPTIBILITY OF THE ELEMENTS AND INORGANIC COMPOUNDS"; http://www-.fizika.si/magnetism/MagSusceptibilities.pdf.

The invention claimed is:

1. A method for measuring relative concentrations of materials of a mixture, comprising:
   a/ providing an emission coil and at least one reception coil;
   b/ providing a mixture comprising n materials with different magnetic susceptibilities;
   c/ introducing the mixture into the at least one reception coil;
   d/ using an electric voltage generator to supply the emission coil with at least one non-zero excitation frequency so as to generate an excitation magnetic field, applying a given voltage by varying the at least one excitation frequency;
   e/ measuring a signal of the electric voltage induced in the at least one reception coil; and
   f/ determining the relative concentrations of the n materials based on a comparison between an overall susceptibility of the mixture obtained by the electric voltage measurement according to e/and that of a reference mixture for which relative concentrations of the n materials are known.

2. The measurement method as claimed in claim 1, wherein the mixture provided according to b/ is a binary mixture of materials with two different magnetic susceptibilities ($\chi 1$, $\chi 2$).

3. The measurement method as claimed in claim 1, wherein the mixture provided according to b/ is a mixture comprising more than two materials, with one of the materials having a much higher susceptibility, by a factor of 100, than that of the other materials.

4. The measurement method as claimed in claim 1, comprising, after b/, weighing the mixture so as to obtain, in f), a relative mass concentration of the mixture.

5. The measurement method as claimed in claim 2, comprising, in f), based on a mass of the mixture m (mix)=m1+m2, determining the susceptibility of the mixture provided using the following relationship:

$$\chi\text{mix} = \frac{m1\chi1}{m1+m2} + \frac{m2\chi2}{m1+m2}$$

and determining the respective mass concentrations of the materials using the following relationships:

$$m1 = m(\text{mix})\left(\frac{\chi\text{mix} - \chi 2}{\chi 1 - \chi 2}\right),$$

and $$m2 = m(\text{mix})\left(\frac{\chi\text{mix} - \chi 1}{\chi 2 - \chi 1}\right).$$

6. The measurement method as claimed in claim 1, further comprising, in e/, an in-phase measurement of the signal of the electric voltage induced in the at least one reception coil and/or a phase quadrature measurement so as to obtain the modulus of the signal.

7. The measurement method as claimed in claim 1, wherein the reception coil is tuned so that its resonant frequency is substantially equal to at least one excitation frequency.

8. The measurement method as claimed in claim 1, wherein the mixture provided according to b/ is in a form of a solid compound.

9. The measurement method as claimed in claim 1, wherein a/ comprises providing a single reception coil, and the method further comprises, before c/, carrying out d/and e/so as to obtain a basic signal representing an empty single reception coil.

10. The measurement method as claimed in claim 1, wherein a/ comprises providing two reception coils, the method comprising, before f/, repeating c/to e/ with each of the two reception coils, and subtracting the signals induced by the two coils from one another.

11. The measurement method as claimed in claim 10, comprising electrically connecting the two reception coils in series and tuning their respective reception frequencies.

12. The method as claimed in claim 1, wherein e/ is carried out for each excitation frequency, with synchronous detection.

13. The measurement method as claimed in claim 1, wherein e/ is made up of several measurements, each at a reception frequency around a resonant frequency of the at least one reception coil.

14. The measurement method as claimed in claim 1, wherein d/ is carried out so as to generate an excitation magnetic field with a value of less than 50 mT.

15. The measurement method as claimed in claim 1, when the mixture comprises a ferromagnetic material, comprising, before c/, exposing the mixture to a constant magnetic field.

16. A system for measuring relative concentrations of n materials of a mixture, configured to implement the method as claimed in claim 1, comprising:

the electric voltage generator being configured to generate at least one excitation frequency, the generator being a variable-frequency low-frequency generator;

the emission coil being connected to the generator;

the at least one reception coil having a shape configured to receive the mixture comprising the n materials with different magnetic susceptibilities and having a reception frequency of which is tuned to the at least one excitation frequency; and voltage measurement means connected to the at least one reception coil.

17. The system as claimed in claim 16, comprising two reception coils electrically connected in series, the respective reception frequencies of which are tuned.

18. The system as claimed in claim 16, wherein the one or more reception coils are arranged inside the emission coil.

19. The system as claimed in claim 16, further comprising:

a housing configured to provide electromagnetic protection;

a first connector mounted in the housing, connected to the emission coil by a first power supply wire inside the housing, wherein the first connector is configured to be remotely connected to the generator by a first power supply cable; and a second connector mounted in the housing, connected to at least one reception coil by a second power supply wire inside the housing, wherein the second connector is configured to be remotely connected to the measurement means by a second power supply cable.

20. The system as claimed in claim 16, wherein the voltage measurement means comprises a synchronous detection amplifier.

21. The system as claimed in claim 16, wherein the at least one reception coil is coaxially arranged inside the emission coil by defining a passage therein for a portion of a conveyor configured to move the mixture in a form of a solid product.

22. The system as claimed in claim 21, comprising two reception coils remotely arranged one behind the other, and arranged relative to the emission coil so as to carry out three successive measurements when the solid product moved by the conveyor is respectively outside the reception coils, in one of the reception coils and then in the other one of the reception coils.

23. The system as claimed in claim 21, wherein a portion of the conveyor passing through the reception coils is a band or a belt of a motorized conveyor.

24. The method as claimed in claim 1, comprising measuring relative mass concentrations of plutonium (Pu) and uranium (U), and associated oxides in MOX-type nuclear fuel pellets.

* * * * *